United States Patent [19]

Bateman et al.

[11] 4,320,299

[45] Mar. 16, 1982

[54] POSITION-SENSITIVE NEUTRAL PARTICLE SENSOR

[75] Inventors: James E. Bateman, Abingdon; John F. Connolly, Reading, both of England

[73] Assignee: National Research Development Corporation, London, England

[21] Appl. No.: 915,553

[22] Filed: Jun. 14, 1978

[30] Foreign Application Priority Data

Jun. 24, 1977 [GB] United Kingdom ............... 26595/77

[51] Int. Cl.³ ............................................. G01T 1/18

[52] U.S. Cl. .................................... 250/374; 250/385

[58] Field of Search ............... 250/374, 375, 385, 388, 250/389

[56] References Cited

U.S. PATENT DOCUMENTS

| | | | |
|---|---|---|---|
| 3,891,851 | 6/1975 | Fletcher et al. | 250/385 |
| 4,075,491 | 2/1978 | Boyd | 250/385 |

FOREIGN PATENT DOCUMENTS

| | | |
|---|---|---|
| 445485 | 4/1936 | United Kingdom . |
| 655803 | 8/1951 | United Kingdom . |
| 932210 | 7/1963 | United Kingdom . |
| 1046235 | 10/1966 | United Kingdom . |
| 1364065 | 8/1974 | United Kingdom . |
| 1385527 | 2/1975 | United Kingdom . |
| 1412250 | 10/1975 | United Kingdom . |
| 1445519 | 8/1976 | United Kingdom . |

OTHER PUBLICATIONS

*Medical Images: Formation, Perception and Measurement*, edited by Geo. A. Hay, "Multiwire Proportional Chambers" by D. H. Reading, pp. 39–49 (John Wiley & Sons).

*Nuclear Instruments and Methods*, vol. 124, pp. 491–503, (1975) (The High-Density Multiwire Drift Chamber).

*Nuclear Instruments and Methods*, vol. 117, pp. 599–603 (1974) (Investigations on Metal Converters for Gamma-Ray Detection and Mapping).

*IEEE Transactions on Nuclear Science*, vol. NS-23, pp. 640–644 (1976) (The Proportional Chamber Gamma Camera).

*Primary Examiner*—Alfred E. Smith
*Assistant Examiner*—Janice A. Howell
*Attorney, Agent, or Firm*—Cushman, Darby & Cushman

[57] ABSTRACT

In a method of sensing the position of a neutral particle, the particle is received in one of two spaced parallel cathode arrays, each of which comprises a plurality of metal strips arranged adjacent and edge to edge, the strips in one array being orthogonal to the strips of the other array, and the metal of which the strips are formed being such that a neutral particle is converted to a fast electron which escapes from the cathode. Between the two cathode arrays is an anode array consisting of parallel wires held at a known electrical potential and surrounded by a gas. The fast electron is converted to an avalanche of electrons and positive ions; the presence of the ions induces an electrical charge in at least one strip of each cathode array; and the presence of the charges is sensed to determine an orthogonal position.

12 Claims, 5 Drawing Figures

$V_1$
$V_0$
$V_2$
10
12
14
16
17
18
19
20
22
24
26
28
30
32
34
36
38
40
+

POSITION-SENSITIVE NEUTRAL PARTICLE SENSOR

This invention relates to position-sensitive sensors for neutral particles such as X-rays gamma rays and neutrons.

It is known that multiwire proportional counters, normally used to detect charged particles in the field of high energy physics, can also be used to detect neutral particles. In Nuclear Instruments and Methods, Volume 124, 1975, pages 491 to 503, A. P. Jeavons et al summarize the possible approaches and describe a device in which incident gamma rays are absorbed in a matrix structure of a suitable converting solid material such as a lead alloy; photoelectrons are produced in the converter and escape into the voids in the matrix which contain a typical gas mixture, and secondary electrons are released in the gas. An electric field is applied to the matrix to cause the secondary electrons to drift onto a conventional multiwire proportional counter at one end of the matrix.

However, the device has the disadvantages that all signals occur in a single anode plane, so that three-dimensional resolution is not possible, and that long drift times may occur so that good time resolution is not possible. Further, while particles having energies of about 660 kev can be successfully detected, for particles having energies of about 140 kev a very fine matrix must be used, having for example 0.08 millimeter diameter holes on 0.1 millimeter centres. This is because the range of photoelectrons varies rapidly with energy; such a fine structure is difficult to make accurately.

Also in Nuclear Instruments and Methods, volume 117, 1974, pages 599 to 603, U. Shimoni et al describe investigations into the efficiency of metal converters for gamma ray detection and disclose a mapping device based on cathode planes made of thin lead strips (x direction) and anode planes made of very thin copper strips (y direction). Detection on the electrodes of photoelectron-initiated ionisation in a gas between the electrode planes gives the x and y co-ordinates of the gamma ray which was converted to the photoelectron.

However, the disclosed device cannot work on the same principle as a multiwire proportional counter because electrical breakdown would occur at the high electric fields required for operation in this mode; it is believed that only pulsed operation, analogous to a spark chamber, is possible for the device.

In the present invention, there is no need for a fine matrix structure, and the device can operate continuously. Particles having a wide range of energies can be detected by selection of the appropriate material.

According to the invention, a position-sensitive method of sensing a neutral particle comprises receiving the particle in one of two spaced parallel cathode arrays, each comprising a plurality of metal strips arranged adjacent and edge to edge, the strips in one array being orthogonal to the strips in the other array, the metal of which the cathode arrays are formed being such that the neutral particle is converted to a fast electron which escapes from the cathode;

receiving the fast electron in a gas between the two cathode arrays and converting the fast electron to ions of the gas and secondary electrons;

converting the secondary electrons to an avalanche of electrons and positive ions between the two cathode arrays;

and sensing in at least one strip of each cathode array the presence of an electrical charge induced by the electrical field surrounding said positive ions in the avalanche.

It will be immediately understood that whereas conventionally in multi-wire particle counters an incident particle is converted to an electron in the gas between the cathodes, in the apparatus according to the invention, this conversion occurs within the cathode material.

Also according to the invention, a position-sensitive neutral particle sensor comprises two spaced parallel cathode arrays, each comprising a plurality of metal strips arranged adjacent and edge to edge, the strips in one array being orthogonal to the strips in the other array, the metal of which the cathode arrays are formed being such that an incident neutral particle is converted to a fast electron which escapes from the cathode;

means for connecting each strip of each cathode array to a known electrical potential, usually earth;

an anode array between and parallel to the cathode arrays and comprising a plurality of spaced metal wires; and means for connecting all of the wires of the anode array to a source of electrical potential.

Further according to the invention, a multiple position-sensitive neutral particle sensor comprises a plurality of sensors according to the invention arranged with at least one cathode array in each sensor closely adjacent a cathode array of another sensor, preferably with the strips in adjacent cathode arrays in the same orthogonal direction; and means for supplying a gas to the volume between each anode array and its two associated cathode arrays.

A position-sensitive neutral particle sensing system comprises a multiple particle sensor, and means for sensing the presence of an induced electrical charge in at least one strip in each cathode array of at least one sensor and for providing an output signal representing an orthogonal position in the at least one sensor. Usually a multiplicity of particles will be received, and a display corresponding to each sensed particle will be provided at the corresponding orthogonal position on a two-dimensional display device, such as a cathode ray tube.

A gamma camera or an X-ray camera according to the invention comprises a position-sensitive neutral particle sensing system, and a collimator arranged to allow passage of neutral particles only in a direction substantially perpendicular to each cathode plane of each sensor.

A position camera according to the invention comprises two spaced position-sensitive neutral particle sensing systems and coincidence sensing means arranged to sense the simultaneous arrival of a neutral particle in each sensing system. Such a camera will record the simultaneous arrival in each system of neutral particles emitted by a decaying positron at a position between the two systems.

The invention will now be described by way of example with reference to the accompanying drawings in which.

Figure 4:
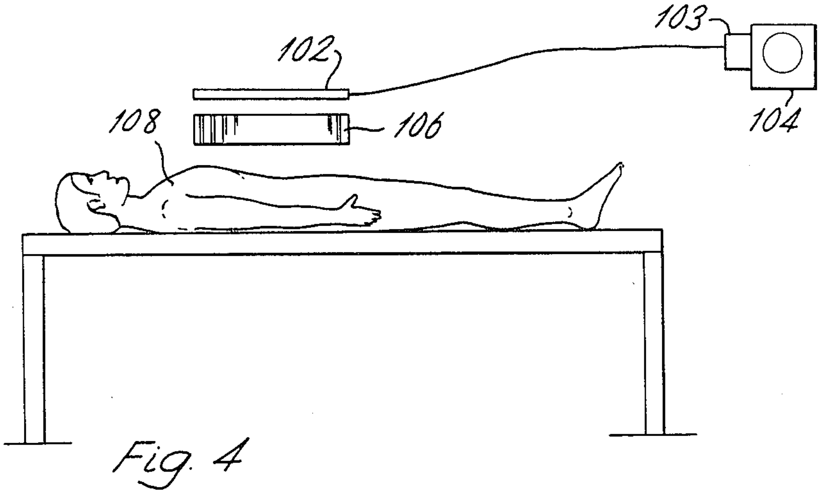
Figure 5:
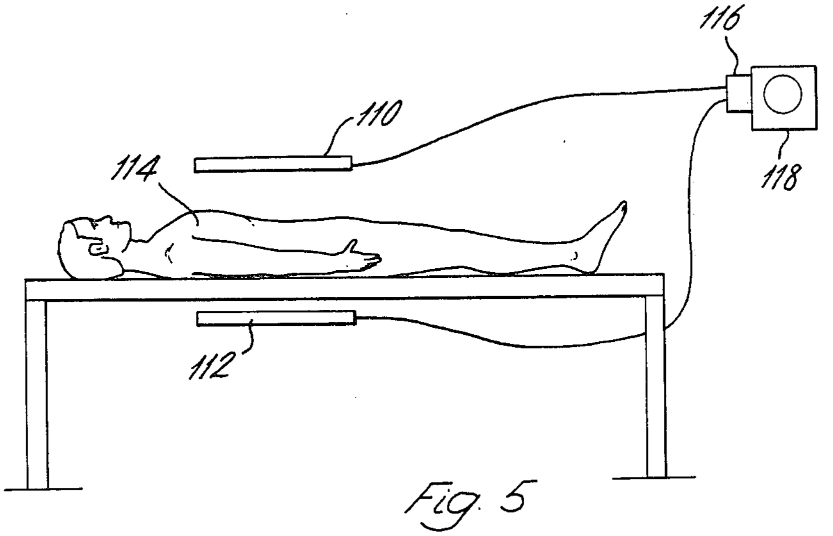

FIG. 4 indicates use of a multiple neutral particle sensor as a medical gamma camera; and FIG. 5 indicates use of two multiple neutral particle sensors as a medical positron imaging sensor.

Figure 1:
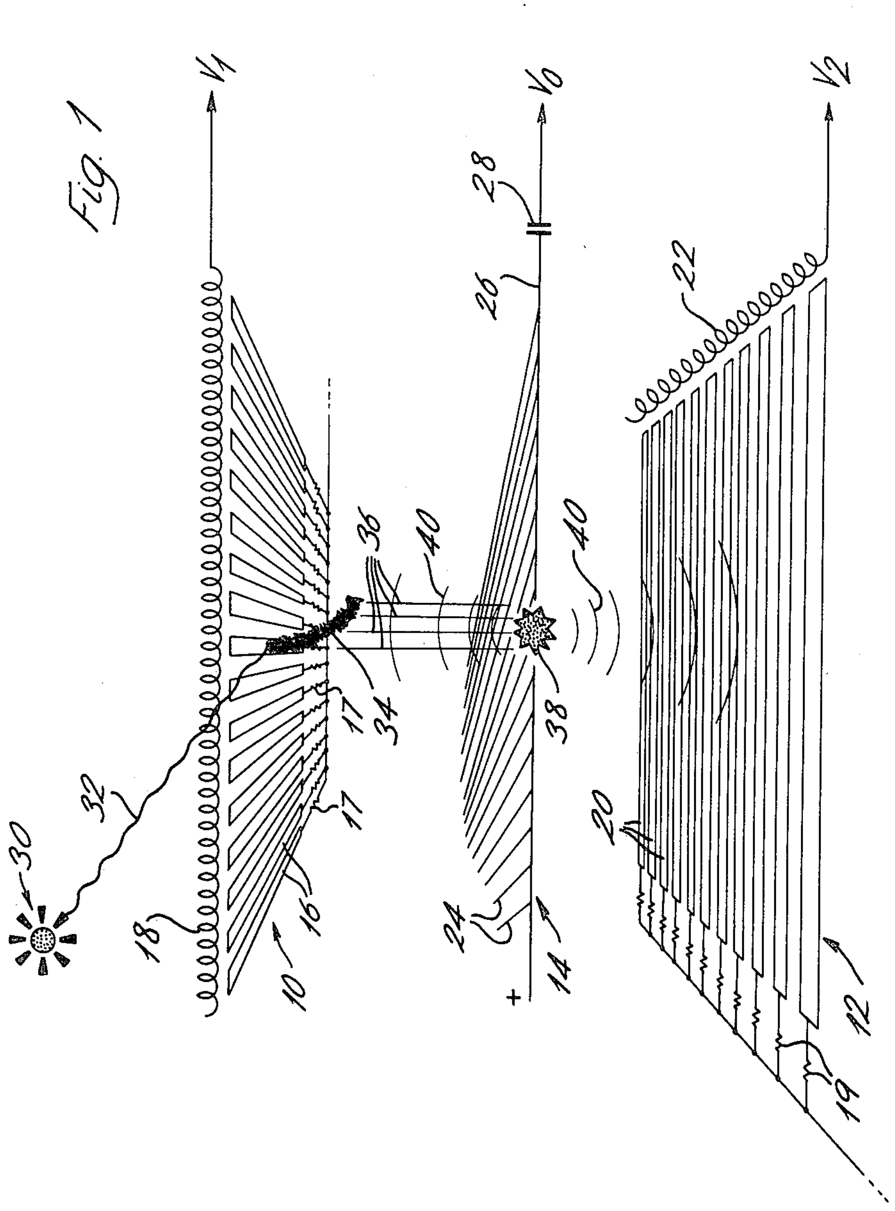
FIG. 1 is an exploded sketch view of a neutral particle sensor according to the invention.

In FIG. 1, a position-sensitive neutral particle sensor comprises first and second planar cathode arrays 10, 12 and a planar anode array 14, all three arrays being parallel and the anode array being between the cathode arrays.

The first cathode array 10 consists of a series of strips 16 of metal foil, arranged closely spaced edge-to-edge in the cathode plane but insulated from each other; one end of each strip is connected to earth through a 220 kΩ resistor 17, and the other end of each strip is connected to a delay line 18 which can provide an output signal $V_1$. The second cathode plane is similar, consisting of a series of strips 20 arranged with their longitudinal direction at 90° to the strips in the first cathode plane, earthed through resistors 19 and connected to a delay line 22 which can provide an output signal $V_2$. The anode plane 14 consists of a series of spaced metal wires 24 each connected at one end to a common lead 26 thrugh which a positive electrical potential is supplied to each wire and which also can provide an output signal $V_o$ through a capacitor 28.

In the Figure, the anode wires are arranged at 45° to the cathode strips. This is not essential; the wires can be parallel to one array of strips, or make an angle other than 0°, 45° or 90° with the cathode strips.

A gas (not known) such as the gas used in a conventional multiwire proportional counter, is supplied to surround the cathode and anode arrays.

The Figure is not to scale and is exploded so that the sequence of events can be illustrated clearly.

Suppose a source of neutral particles, represented by reference 30, emits a particle along a path 32 towards the sensor. If the metal foil cathodes are of the correct material and thickness, considering the energy of the incident particle, the particle is absorbed by one cathode strip and a fast electron 34 is emitted into the gas; this electron has a speed approaching relativistic values and may be a photoelectron or a Compton electron. The fast electron ionises gas atoms to produce a secondary ions and electrons. The ions drift slowly towards the cathode and can be ignored. The electrons are attracted towards the anode along the path 36 and as they approach an anode wire closely, encounter a very high electric field. An avalanche of electrons and positive ions is initiated. The electrons are attracted to the anode wire, and are released into the external anode circuit by the movement of the positive ion cloud 38 away from the anode wires, and generate a negative output signal $V_o$ at a time which is very shortly after the time of arrival of the initial neutral particle, and can be regarded as indicating the time of that arrival.

The movement of the cloud of ions away from the anode wires also generates an electrostatic induction field 40, which in turn results in a positive charge pulse in several cathode strips in each array. Each strip provides a positive output pulse; the cathode strips immediately above and below the electron avalanche provide the largest signals; adjacent strips receive less charge and provide lower signals. The output pulses from the strips in each cathode array are coupled onto the respective delay lines 18, 22, and the delay lines, in effect, merge the separate pulses to provide a single pulse, slightly spread in time, which travels along the delay line; the time of arrival of the pulse maximum at the delay line output can be related to the position along the delay line of the strip receiving maximum charge. Since the strips in each cathode array are arranged othogonally, the x-y co-ordinates of the electron avalanche, and thus the position of the received neutral particle, can be determined. Such an arrangement of delay lines and time measurement meas is well known in the field of multiwire proportional counters.

Figure 2:
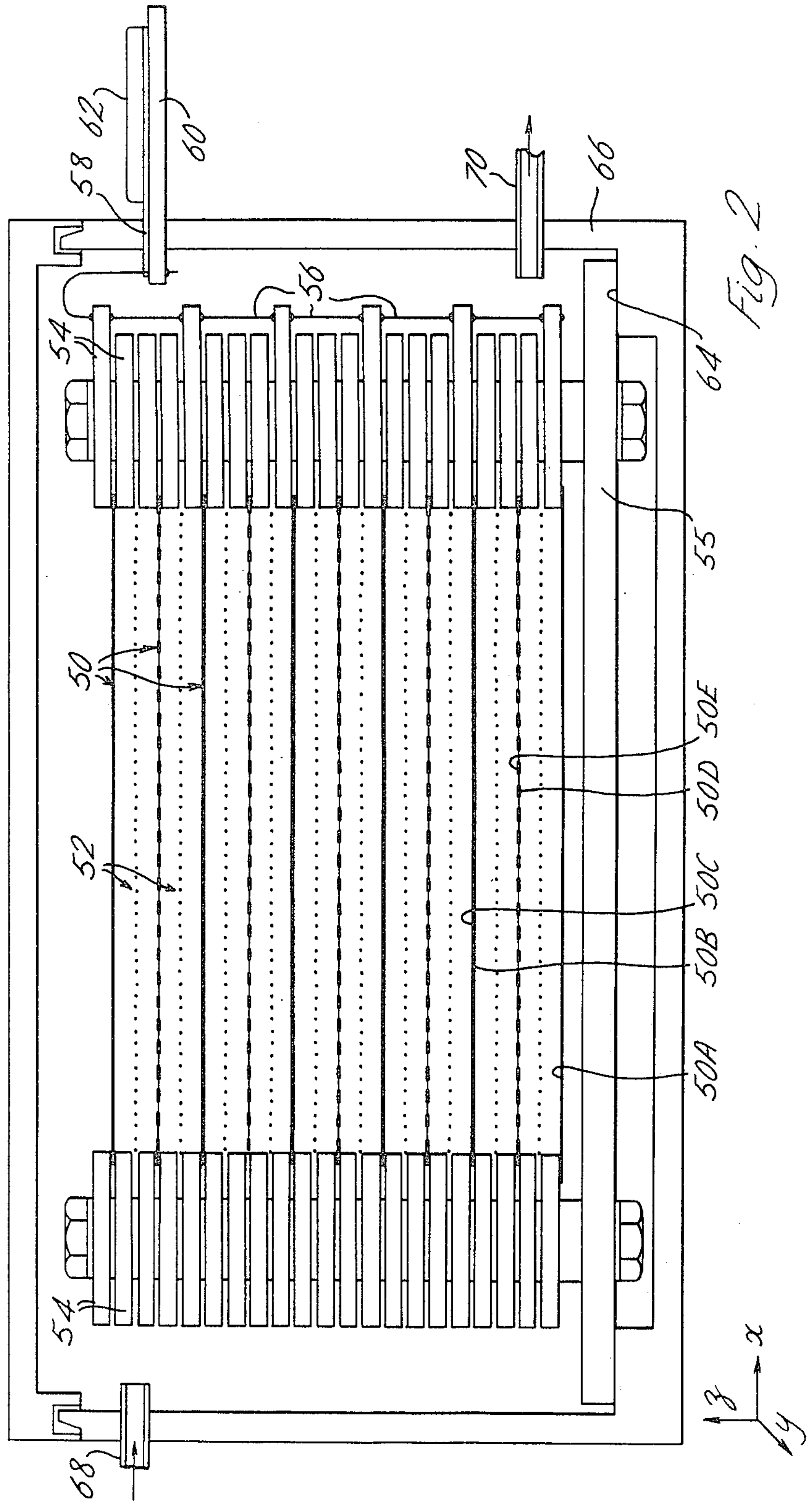
FIG. 2 is a sectional diagram of a stack of sensors forming a multiple neutral particle sensor.

It has already been stated that a plurality of sensors according to the invention will be required to provide a sufficiently high detection efficiency for a practical neutral particle counter, and a typical multiple sensor is shown in section in FIG. 2.

The multiple sensor comprises twenty cathode arrays 50 and ten anode arrays 52. Each cathode array comprises a series of strips of metal foil supported by a film of a suitable plastics material, such as polyethyleneteraphthalate; an example is a Kaptan (Registered Trade Mark) film 12.5 microns thick. The two outer cathodes have metal strips on only the inner side of the film, but the other cathodes have strips, in the same orthogonal direction, on both sides of the film. The films are supported at their edges between spacers 54 which are bolted together to form a rigid stack, and the spacers are bolted to a base board 55.

In a neutral particle sensor according to the invention, as explained above, each cathode array acts as a converter for a neutral particle as well as a position read-out. The material and the thickness of the cathode strips must be chosen in accordance with the energy of the neutral particle to be detected, considering the binding energy of the converter material and the escape probability of a fast electron produced in the material; the escape probability varies with thickness.

For the detection of X-rays having an energy of 60 KeV, such as those emitted by $^{241}$ Americium, each cathode strip in FIG. 2 may be made of copper about 5 microns thick.

For the detection of gamma rays having an energy 140 KeV, such as those emitted by $^{99m}$ Technicium, each cathode strip in FIG. 2 may be made of tin about 12.5 microns thick, and a typical multiple sensor would comprise 20 to 25 sensors.

For the detection of gamma rays having an energy of 510 KeV, such as those provided by positron annihilation, each cathode strip in FIG. 2 may be made of lead about 125 microns thick, and a typical counter would comprise 10 to 15 sensors.

For the detection of thermal neutrons having an energy of 100 meV each cathode strip in FIG. 2 may be made of gadolinium about 10 microns thick.

In the examples of materials and thicknesses given above, each thickness is half the preferred thickness provided from the calculations; this is because each inner cathode array is spaced very close to another cathode array, the combination giving the desired thickness; the insulating film between the two arrays must be very thin to prevent absorption of the fast electrons.

Typically the spacing between each anode and the adjacent cathodes is 4 millimeters. The smaller this gap, the better the spatial resolution of the counter. The anode wires may, for example, be gold-plated tungsten wires 20 microns in diameter, spaced at 2 millimeters.

The baseboard 55 carrying the spacers 54 is supported by lips 64 within a gas-tight enclosure 66, for example a glass fibre-epoxy composite box. Conveniently the array of electrodes 58 and the delay lines 62 are outside the container. A gas inlet tube 68 and gas outlet tube 70 are provided.

Any gas conventionally used in a multiwire proportional counter may be used; the more dense the gas, the better the spatial resolution of the counter. Xenon or 2-2 dimethylpropane or pure isobutane or a mixture of 70% argon and 30% isobutane may be used. It is an advantage of a counter according to the invention, in which the anode-cathode spacing can be quite small, that slightly electronegative gases can be used. In use, the gas is caused to flow continuously through the sensor; the gas may need to be at a pressure higher than atmospheric pressure.

It is to be understood, however, that in a sensor according to the invention, the gas does not convert neutral particles to fast electrons, as in a conventional multiwire proportional counter, but provides a medium in which an electron avalanche and ion cloud can be initiated by a fast electron produced in the cathode of the device by a neutral particle.

FIG. 2 shows that some cathode strips are arranged with their length parallel to the plane of the Figure, such as in cathode arrays 50A, 50B, 50C, while other cathode strips are arranged with their length perpendicular to the plane of the Figure, such as in cathode arrays 50D, 50E.

Considering the former type of array, and considering the section of the Figure to be a vertical section in the x-z plane with z being the co-ordinate in the vertical direction, then all strips vertically above each other have the same x or y co-ordinate. Since the cathode arrays are required to provide only x or y co-ordinates, all the vertically-stacked strips can be bussed, as indicated by the connector 56 for the stack of strips through which the section is taken; the connector 56 is connected to an electrode 58, which is one of a series of electrodes spaced, in the plane perpendicular to the Figure, on a support 60. A delay line 62, of the wire-wound type, is placed in contact with the electrode series. A similar arrangement is used to bus strips having their length perpendicular to the plane of the Figure.

A bussed arrangement allows a much simpler readout system to be used.

The anode arrays are not bussed vertically, because a signal indicating in which anode plane an electron avalanche is received may be required to give the z co-ordinate.

Figure 3:
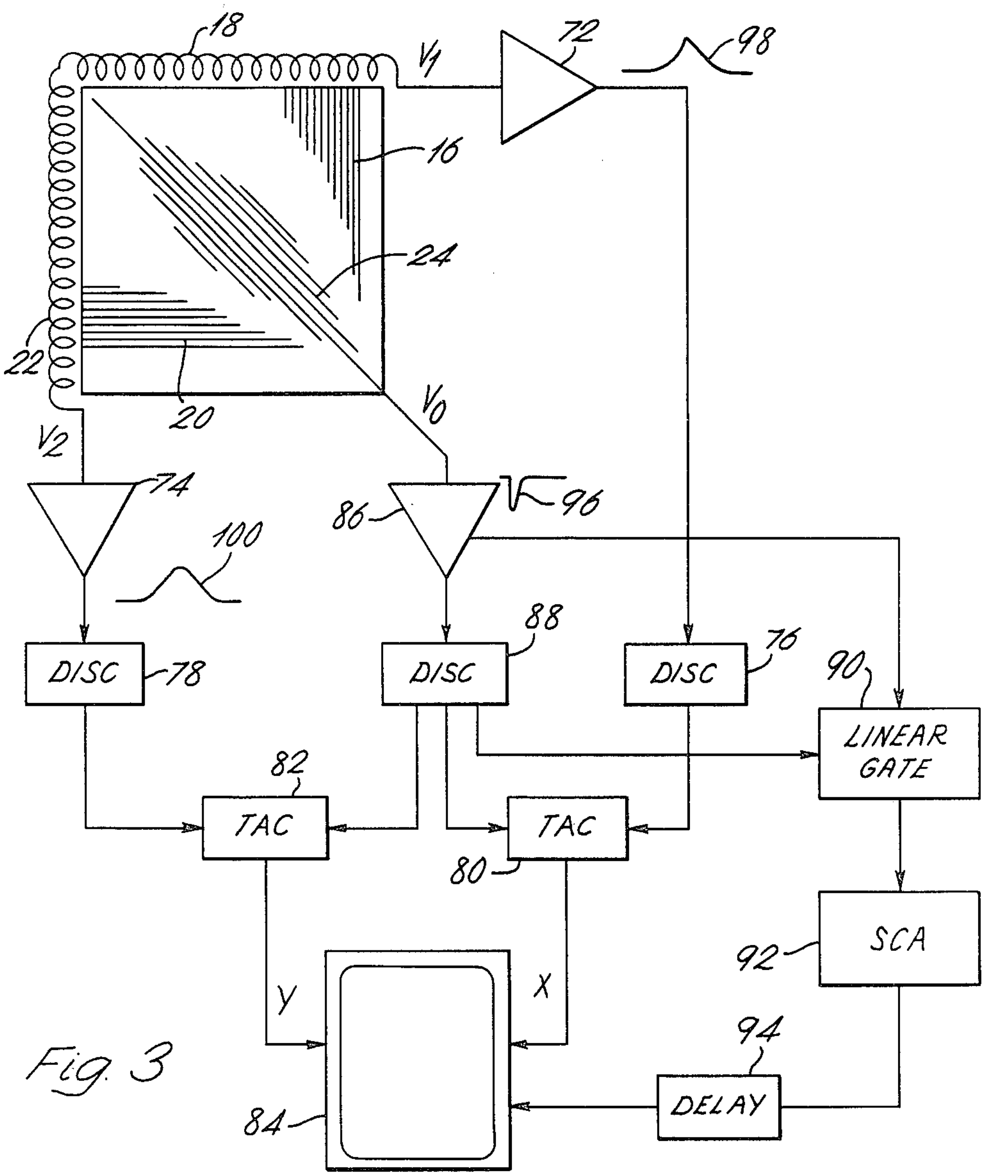
FIG. 3 is a schematic diagram of electronic circuitry associated with a multiple particle sensor.

Suitable electrical readout circuitry is shown in FIG. 3. The arrays of cathode strips 16 and 20 and the anode wires 24 are indicated schematically. The delay lines 18, 22 are connected through respective amplifiers 72, 74 and discriminators 76, 78, each to one input of respective time-to-amplitude converters (TAC) 80, 82, which supply respectively the x and y signals to a display unit 84. The anode array is connected through an amplifier 86 and discriminator 88 to the other input of each TAC 80, 82. The amplifier 86 is also connected to a linear gate 90 both directly and through the discriminator 88, and the gate is connected to the display unit 84 through a single channel analyser (SCA) 92 and delay device 94.

When a negative pulse, reference 96, is received from one anode plane as an electron avalanche occurs, this pulse is used as a prompt pulse for the circuit. The prompt pulse causes the TAC's 80, 82 to start; arrival of the respective positive pulses 98, 100 from the cathodes through the delay lines stops the TAC's. The TAC output signals indicate the co-ordinates in the x-y plane of an initiating neutral particle event, and a display is provided on the display unit 84 at the corresponding position on the screen.

The prompt pulse also provides a bright-up pulse for the display unit 84, through the SCA 92, which integrates the total charge deposited in the counter by the electron avalanche and acts as a pulse height selector, and through the delay device 94 which delays the bright-up pulse by a time interval required by the display system 84.

If many neutral particles are incident on the multiple sensor, a picture may be built up, either by using a storage oscilloscope as the display unit, or by use of photographic methods or of a digital computer.

It is a particular advantage of a sensor according to the invention that a large sensing area may be provided, for example of the order of one square meter. Such a device may be extremely useful in medical applications. For example, the sensor may be used as a gamma camera to detect gamma radiation emitted by an organ of the human body after the administration of $^{99m}$ Technicium in suitable form.

An example of such an arrangement is illustrated in FIG. 4 in which a gamma camera comprising a multiple position-sensitive neutral particle sensor according to the invention 102, is connected through suitable circuitry 103 to a display unit 104. A collimator 106, consisting of a lead plate 25 millimeters thick and having a matrix of parallel open channels of about 4 millimeters diameter, is arranged between the sensor and a live human body 108. In this arrangement, the collimator 106 absorbs all gamma rays which do not pass substantially vertically upwards, and a two-dimensional picture of a gamma-ray emitting organ is obtained.

In another medical use, instead of $^{99m}$ Technicium, a positron-emitting substance is administered to a patient. Two multiple position-sensitive neutral particle sensors may be arranged to detect the gamma rays emitted back-to-back by positron annihilation. Such an arrangement is shown in FIG. 5 in which two multiple sensors according to the invention 110, 112 are spaced above and below a live human body 114. The sensors are connected through suitable circuitry 116 to a display unit 118 in such a way that only coincident gamma rays are displayed and a reconstruction of the distribution of the positron emitting substance within the live human body is exhibited on the display unit 122 by means of a suitable computer.

We claim:

1. A cathode plate for use in a position-sensitive neutral particle sensor comprising:

a thin insulating support having on each face a cathode array of spaced metal strips arranged adjacent and edge to edge, the metal of which the strips are formed being such that an incident neutral particle is converted to a fast electron which escapes from the cathode plate, and the thickness of each strip being approximately half the thickness theoretically required.

2. A cathode plate according to claim 1 in which both cathode arrays are identical and the strips lie in the same orthogonal direction.

3. A cathode plate according to claim 1 for sensing X-rays having an energy of approximately 60 KeV in which both cathode arrays comprise copper strips 5 microns thick.

4. A cathode plate according to claim 1 for sensing gamma rays having an energy of approximately 140

KeV in which both cathode arrays comprise tin strips 12.5 microns thick.

5. A cathode plate according to claim 1 for sensing gamma rays having an energy of approximately 510 KeV in which both cathode arrays comprise lead strips 125 microns thick.

6. A cathode plate according to claim 1 for sensing thermal neutrons having an energy of approximately 100 meV in which both cathode arrays comprise gadolinium strips 10 microns thick.

7. A position-sensitive neutral particle sensor comprising two cathode plates each including a respective thin insulating support having on each face a cathode array of spaced metal strips arranged adjacent and edge to edge, the metal of which the strips are formed being such that an incident neutral particle is converted to a fast electron which escapes from the cathode plate, and the thickness of each strip being approximately half the thickness theoretically required, the plates being parallel and closely spaced with the strips in the cathode arrays on adjacent faces of the plates being arranged orthogonally, means for connecting each strip of said cathode arrays on adjacent faces to a known electrical potential, an anode array between and parallel to the cathode arrays and comprising a plurality of spaced wires, means for connecting all of the wires of the anode array to a source of electrical potential, means for supplying a gas to the volume around each anode array, and means for sensing the presence of an induced electrical charge in at least one strip in each cathode array and for providing an output signal representing an orthogonal position in the sensor.

8. A multiple position-sensitive neutral particle sensor comprising at least three cathode plates each including a thin insulating support having on each face a cathode array of spaced metal strips arranged adjacent and edge to edge, the metal of which the strips are formed being such than an incident neutral particle is converted to a fast electron which escapes from the cathode plate, and the thickness of each strip being approximately half the thickness theoretically required, the plates being parallel and closely spaced with the strips in the cathode arrays on adjacent faces of the plates being mutually orthogonal;

means for connecting each strip of each cathode array to a known electrical potential, in each space between the cathode plates an anode array comprising a plurality of spaced wires, means for connecting all of the wires in each anode array to a source of electrical potential, means for supplying a gas to the volume around each anode array, and means for sensing the presence of an induced electrical charge in at least one strip of both cathode arrays adjacent one anode array and for providing an output signal representing an orthogonal position in those cathode arrays.

9. A multiple sensor according to claim 8 further comprising means for sensing the arrival of a high energy electron at an anode array.

10. A multiple sensor according to claim 8 having display means arranged to provide an orthogonal display for each of a multiplicity of received particles.

11. A multiple sensor according to claim 8 having a collimator arranged to allow passage of gamma rays or X-rays only in a direction substantially perpendicular to the plane of the cathode arrays for comprising a camera sensitive to such passed rays.

12. A positron sensor comprising two multiple position-sensitive neutral particle sensors each comprising:

at least three cathode plates each consisting of a thin insulating support having on each face a cathode array of spaced metal strips arranged adjacent and edge to edge, the metal of which the strips are formed being such that an incident neutral particle is converted to a fast electron which escapes from the cathode plate, and the thickness of each strip being approximately half the thickness theoretically required, the plates being parallel and closely spaced with the strips in the cathode arrays on adjacent faces of the plates being mutually orthogonal, means for connecting each strip of each cathode array to a known electrical potential, in each space between the cathode plates an anode array comprising a plurality of spaced wires, means for connecting all of the wires in each anode array to a source of electrical potential, means for supplying a gas to the volume around each anode array, means for sensing the presence of an induced electrical charge in at least one strip of both cathode arrays adjacent one anode array and for providing an output signal representing an orthogonal position in those cathode arrays, and coincidence sensing means arranged to sense the simultaneous arrival of a neutral particle in each sensing system.

* * * * *